United States Patent [19]

Gardner et al.

[11] 4,057,091
[45] Nov. 8, 1977

[54] PNEUMATIC TIRE

[75] Inventors: James Dennis Gardner, Akron; Robert William Glasscock, Canal Fulton, both of Ohio

[73] Assignee: The Firestone Tire & Rubber Company, Akron, Ohio

[21] Appl. No.: 674,710

[22] Filed: Apr. 7, 1976

[51] Int. Cl.² .................... B60C 5/12; B60C 15/00
[52] U.S. Cl. ...................... 152/353 R; 152/362 R
[58] Field of Search .......... 152/353 R, 352 R, 353 C, 152/330 R, 330 RF, 362 R, 354; 156/123, 131, 132; 425/31, 32, 39, 44

[56] References Cited

U.S. PATENT DOCUMENTS 3,297,073   1/1967   Black et al. .................. 152/362 R
3,540,510   11/1970  Smithkey ...................... 152/352

Primary Examiner—Robert B. Reeves
Assistant Examiner—Francis J. Bartuska

[57] ABSTRACT

This disclosure related to a pneumatic tire which is collapsible in its uninflated shape. This disclosure relates to a pneumatic tire and the rim combination of the pneumatic tire and a rim wherein the bead areas of the tire are capable of rotating in their mounted, uninflated shape to attain a different configuration in their mounted, inflated shape. The tire may have the characteristic wherein the sidewalls are capable of being folded axially inwardly toward each other when the tire is mounted on the rim and uninflated. In the uninflated and folded shape the tire and the combination of the tire and rim of this disclosure conserve space and weight over a standard tire and tire and rim combination. This uninflated, folded feature is designed primarily to be used as a spare tire replacement in automobiles.

9 Claims, 3 Drawing Figures

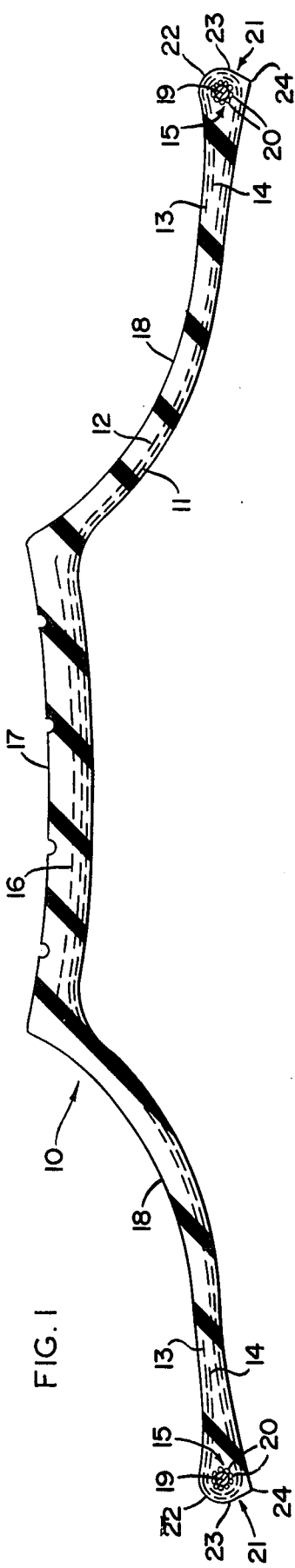
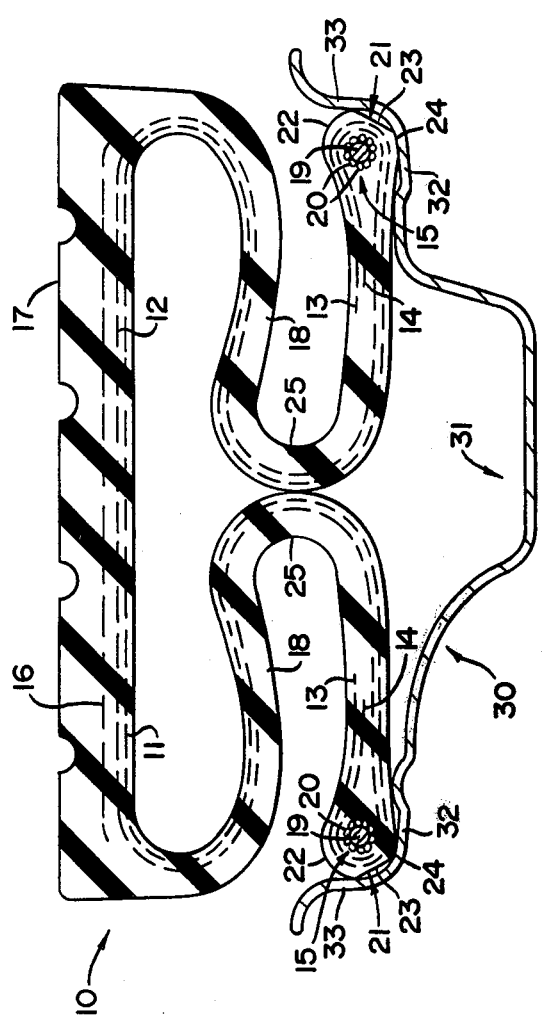
FIG. 1
FIG. 2

PNEUMATIC TIRE

BACKGROUND OF THE INVENTION AND PRIOR ART

This invention relates to a tire and a tire and rim combination in which the tire may be collapsed in its uninflated state to assume smaller overall dimensions than the tire has in its inflated, operable shape. Such folding yields a smaller physical package than a standard tire to tire and rim combination which results in a savings of space and weight. The tire of this invention is particularly useful as a spare tire for passenger automobiles.

Due to the excellent performance record of tires over the past 20 years, the space tire is an automobile is now considered less of a necessity and a product that merely goes along for the ride in most instances. Considering the number of automobiles presently in use and the number of spare tires contained therein, the transportation of the spare tire represents a major wastage of natural resources, particularly fuel and raw materials. Much emphasis is now being placed on a tire designed specifically to be a spare tire with limited service capabilities that conserves space in the automobile, contains less raw materials, and most importantly, weighs less than a standard tire. Such a tire permits the design of smaller, lighter automobiles and represents a reduction of weight in an automobile. Such a reduction means a fuel savings because the automobile is simply carrying less weight.

Certain manufacturers have approached this problem in different ways, all of which have disadvantages. U.S. Pat. Nos. 3,347,300; 3,347,301; 3,347,964; 3,372,726; 3,393,725; 3,394,751; 3,421,566; 3,570,572; 3,394,750; 3,400,746; and 3,506,748 represent one such method; U.S. Pat. Nos. 3,657,039; 3,833,042 and 3,540,510 represent another method and U.S. Pat. No. 3,610,310 represents yet another method.

The method and product exemplifying the first approach has a major disadvantage in that the tire is cured in a bladderless state; that is, in the curing or vulcanizating operation no internal member is inserted into the tire to encase the steam that is utilized inside the tire to obtain vulcanization. Bladderless curing operations are notoriously difficult to accomplish by mass production techniques and the rate of factory rejects always is extremely high in such operations. Additionally, due to the cured fold in the tire sidewall and the cured configuration of the bead area (see U.S. Pat. No. 3,347,300), the lower sidewall area (the area immediately adjacent the tire bead) of the tire of this approach is subjected to a great deal of buckling on inflation which creates stresses they may result in performance problems in this area of the tire. Additionally, the cured, folded sidewall configuration creates inspection problems in the cured tire as it is very difficult to visually inspect the inside of the tire for possible building or curing defects with the folds present.

The second approach does not employ bladderless curing but utilizes a standard type curing operation wherein a bladder is inserted in the tire prior to vulcanization. However, due to the cured configuration of the bead area, this approach does not eliminate the buckling and resulting stress problem in the lower sidewall area of the tire.

Little is known of the third approach beyond that disclosed in the cited reference. It is envisioned that this third method would employ a standard, bladder type curing operation but that this method would also, due to the cured configuration of the bead area, have the high stress concentrations in the lower sidewall area of the tire. Additionally, this approach would also have a folded width larger than the other approaches.

All of the tire construction exemplified by these three prior approaches have the tire bead areas stationary or cured in the standard configuration; that is, in substantially the same configuration as they have in their mounted, either inflated or uninflated, shapes. This means that, whether the tire is built on a flat building drum or a contour drum, the tire bead areas are stationary or fixed and attain the shape they will have when the tire is mounted on the rim, either inflated or uninflated, prior to curing and are cured in substantially this shape or configuration. In the contour drum building method, this configuration is obtained on the building drum with little movement of the body ply ends in the bead area during the shaping operation prior to curing. In the flat drum method, this configuration is obtained during the shaping operation prior to the curing by the movement of the body ply ends around the wire bead bundles while the rubber in the tire is still plastic (unvulcanized) and not elastic (vulcanized), as occurs in the curing operation. The above represents standard methods and configurations as are well known in the art.

This standard, preshaped, stationary bead area in the cured tire is an integral part of each of the prior art approaches (see the Figure in U.S. Pat. No. 3,347,300; FIG. 1 in U.S. Pat. No. 3,347,301; U.S. Pat. No. 3,347,964; FIG. 1 of U.S. Pat. No. 3,657,039 and FIG. 1 of U.S. Pat. No. 3,833,042 for examples of the tire bead area after curing). The prior art approaches also demonstrate use of the standard, preshaped bead area in their mounted, uninflated configurations (see the Figure in U.S. Pat. No. 3,347,300; FIG. 2 in U.S. Pat. No. 3,347,301; FIG. 4 in U.S. Pat. No. 3,657,039; FIG. 4 in U.S. Pat. No. 3,833,042 and the Figure in U.S. Pat. No. 3,610,310.) Finally, all the prior art approaches demonstrate the stanard approach that the bead area undergoes no substantial change on inflation from its uninflated shape to its inflated, operable shape (see the Figure in U.S. Pat. No. 3,347,300; FIG. 2 in U.S. Pat. No. 3,347,301; FIG. 2 in U.S. Pat. No.3,657,039; FIG. 2 in U.S. Pat. No. 3,833,042; FIG. 6 in U.S. Pat. No. 3,540,510 and the Figure in U.S. Pat. No. 3,610,310).

The tire and tire and rim combination of this invention depart from the prior art method of curing the tire bead area in the shape it will have when the tire is mounted on the rim and inflated. In this invention the tire is cured with the bead area in a configuration different from its operable, inflated shape. In this invention the mounted, uninflated shape of the bead areas are substantially similar to the cured shape but these are substantially different from the operable shape, mounted and inflated.

This configuration change from cured, mounted shape to inflate shape occurs in the vulcanized tire where the location of the body ply cords are fixed by the vulcanization of the rubber in the tire. It is accomplished by a rotation of the tire body about the central core of the tire bead when the tire is inflated to its operable shape from its mounted, uninflated shape. This rotation of the tire body results in a displacement in the bead area of approximately 90°.

Specifically, the tire of this invention is cured with its bead areas and lower sidewall areas in a plane substantially parallel to the axis of the tire when it is in its operable configuration. The tire is mounted on the rim with the bead areas and lower sidewall retained in this same basic configuration prior to inflation. This configuration eliminates the hump or bend immediately adjacent the bead that is standard in all prior tires having collapsible features. The elimination of this enables the tire of this invention to have the facility of attaining a smaller overall diameter in its collapsed, uninflated configuration. This is due to the fact that the bead area and lower sidewall area of the tire of this invention are permitted to rest directly on the rim base for a substantial distance, whereas in the prior art tires the hump in the bead area does not permit this feature. Additionally, the elimination of the hump removes the severe stresses that are created in the lower sidewall areas of the prior tires by the buckling that occurs in this area when the tire is inflated. This is due to the fact that the entire bead area of the tire of this invention rotates to permit the lower sidewall to move during the inflation stage, whereas in the prior art tires the bead area is stationary or fixed and the lower sidewall area must move in relation to this fixed, bulky area.

Any stresses created in the lower sidewall and bead area of the tire of this invention during the inflation stage are created in the bead area which is then firmly fixed to the rim. These stresses, if any, are created by the rotation of the bead areas about the center of the bead bundle and, as such, are not detrimental to the performance of the tire. Any tire bead structure which permits this action in the bead area is within the scope of this invention.

The preferred method for obtaining this rotation in the bead area embodies the use of what is known in the art as a cable bead construction. One type of cable bead construction contains a solid metal wire core (see U.S. Pat. No. 1,386,072) with individual strands of smaller bead wires helically wrapped around the core. The standard bead bundle construction contains plies of parallel wire which are wrapped around each other. The cable bead construction permits a rotation of the smaller, external bead wires about the heavier wire core so that the rotation is internally in the bead wire bundle as opposed to the fabric rotating about the bead bundle externally as in the standard construction. Beads of this type are known and have been utilized in tire constructions taking advantage of the internal rotation in the bead bundle when the tire is in its uncured state. Such a rotation permits a tire to be constructed wherein there is little displacement of the tire body fabric ends in relation to the body fabric in the bead area during the relocation of the tire body fabric which occurs in the change to the toroidal shape from the flat shape or shaping prior to curing. This feature has been utilized solely with standard, stationary tire bead areas wherein the tire bead areas are cured in the position they will have when the tire is mounted and operable and has not been utilized in cured tires.

In the present invention this cable bead rotation concept is used after the curing operation in a vulcanized tire. This permits the tire to be mounted on the rim with the bead area of the tire in a non-rotated position with the rotation occurring during the inflation step from the folded tire shape to the toroidal shape by the rolling of the bead area of the tire about the center of the bead bundle. This permits the tire to be physically located on the rim in a different configuration in its uninflated state as compared to its inflated state. Such a configuration may result in a smaller tire diameter in its mounted, uninflated and folded shape than has been previously possible.

The tire of this invention may alternatively contain a bead bundle that is comprised of an aramid type fabric. Bead bundles of this type are more flexible than any of the known wire bead bundle constructions, yet give sufficient strength to maintain the integrity of the tire during its operation. Bead bundles of this type permit the movement of the bead area of the tire about the center of the bead bundle to yield the same result as is described above with the cable bead type construction.

It is an object of this invention to obtain a tire which may be folded when uninflated to occupy less space than a standard tire of the same inflated dimensions.

It is a further object of this invention to obtain a foldable tire and rim combination that conserves space when the tire is uninflated as compared to a standard tire of the same inflated dimensions.

It is a further object of this invention to obtain a tire in which the bead areas of the tire are cured in a configuration which permits the bead area and the lower sidewall area to rest on the base of the rim when the tire is mounted and uninflated.

It is a further object of this invention to obtain a tire in which the bead area is molded in a configuration different than the configuration that the bead area obtains when the tire is mounted and inflated.

It is a further object of this invention to obtain a tire in which the bead area is constructed to permit a rotation or rolling of the bead area of the tire around the center of the bead bundle during inflation of the tire to its operable shape.

It is a further objective of this invention to obtain a foldable tire that may be manufactured in a process with bladder-type curing.

It is a further object of this invention to obtain a foldable tire that is free from a high degree of prestress in the lower sidewall area when it is mounted and inflated in its operable condition.

Other objects of this invention will be evident from the disclosure.

SUMMARY OF THE INVENTION

The tire of this invention has a bias cord body and may or may not contain a tread ply to give more strength and support in the tread area. The tire body must be flexible enough to permit the sidewalls to be folded axially inwardly upon themselves to permit the tire to be collapsed in its uninflated state so that the overall diameter of the tire is significantly decreased. The cords utilized in the tire body and thread ply may be any of the standard types, such as rayon, polyester, nylon or aramid. The chords in the tread ply may also include fiberglass types.

The angle of the body ply cords should be on the order of 55° to 60° to the circumferential centerline of the tire tread when the tire is molded. The characteristics of the tire body must be such as to permit the pantographing of the tire body cords from this angle to an angle of 30° to 35° after inflation of the tire when it is in its operative, toroidal shape.

If a tread ply is utilized, the cords and construction thereof must be such as to permit the expansion of the overall diameter of the tire from its collapsed, uninflated shape to its inflated, operable shape. This expansion is on the order of 30 to 40 percent; for example, in a D78-14 size tire, the collapsed shape has an overall maximum diameter of about 19 inches and the maximum inflated overall diameter is on the order of 25 inches, an increase of six inches or 32 percent. The cords in the tread ply may run substantially radially of the tire (at an angle of 90° to the circumferential centerline of the tire tread). However, tread plies with cords of substantially lower angles may also be used; such as, angles between 50° and 60° to the circumferential centerline of the tire tread. When tread plies of this type are used, the cords must pantograph upon inflation to lower angles (much as the body ply cords do) to permit the necessary expansion of the tire from its uninflated to its inflated shape.

The bead area of the tire of this invention comprises an important feature of the tire of this invention. The body of the tire of this invention is built by standard, well known methods on a flat building drum wherein the ends of the body plies are wrapped around the wire bead bundles to engulf the bead bundles. After building, the tire of this invention is cured with the bead area in a configuration wherein the bead area and lower sidewall area extend substantially straight out from the bead bundle in a plane substantially parallel to the axis of the cured tire. Such a configuration is significantly different from the configuration of the tire of this invention in its inflated shape but is substantially the same as the shape of these areas of the tire of this invention in its mounted, uninflated shape.

As such, the tire of this invention is not cured with its bead areas in a stationary, locked configuration such as the prior art tires of this type. As has been stated, the prior art tires of this type are cured with their bead areas in substantially the same configuration as they have in their mounted shape and inflated shape. As such, these tires have bead areas that are fixed or stationary after the curing operation.

In the tire of this invention a rolling or rotational movement is permitted to occur in the bead area after the tire has been cured. This movement permits the tire of this invention to be mounted on a coventional rim with the bead areas and lower sidewall areas directly resting upon the rim base; that is, lying in a plane substantially parallel to the axis of rotation of the tire and rim combination of the tire. The tire construction of this invention permits the bead area to rotate about the core of the wire bead bundle during the tire inflation operation. This rotation is on the order of 90° which permits the tire bead area and lower sidewall area to move from their position resting upon the rim base to a standard position approximately perpendicular to the rim base.

Stated in another way, the bead area of the tire of this invention has a bead toe and a bead heel selection as is known in the art. In prior art constructions when the tire is mounted on a rim, the bead heel is located axially outwardly of the wire bead bundle and the bead toe is located axially inwardly thereon. This same relationship exists when the tire is inflated. When the tire of this invention is mounted on a rim and uninflated, both the heel and the toe sections of the bead area are located axially outwardly of the wire bead bundle. When the tire of this invention is inflated, the rolling action of the bead area relocates the bead area into a standard relationship with the tire rim wherein the heel section of the bead area is located axially outwardly of the bead bundle and the toe area is located axially inwardly.

The configurations in which the prior art bead areas and lower sidewalls are cured creates stresses in these areas which are magnified during the inflation operation by the built-in resistance in these areas. That is, the bends which are cured into these areas of the tire are required to straighten out during the inflation operation. The tire of this invention contains no such cured bends in the bead area and lower sidewall area which are required to be straightened out; therefore, stresses are not built into this area of the tire and the inflation of the tire does not magnify any stresses which may be placed on these areas during inflation. This concept is exemplified by the buckles that are cured into the prior art tires which are removed by the inflation pressures. Such buckles do not occur in the tire of this invention and the wrinkles which occur in the prior art tires in the lower sidewall area during the inflation operation are not present in the tire of this invention.

The cured configuration of the tire of this invention readily permits the use of a bladder type curing. The bead area of the tire of this invention is cured in substantially the same configuration in which it is built. The tread area is cured at a diameter on the order of 30% greater than the diameter in which it is built. This means that there is some expansion during the shaping operation of the unvulcanized tire prior to curing. This expansion results in a minor displacement of the body plies, a minor rotation of the bead structures and a minor angle change of the cords in the body plies.

The bead area of the tire of this invention must be capable of permitting the rolling or rotation which occurs in the cured tire in the inflation step. Cable bead constructions, as defined above, have been found to be useful in obtaining this result. A typical cable bead construction comprises a wire bead bundle having a wire cord with individual wire strands helically wrapped around it. Such a construction permits the rotational movement of the helically wrapped files around the core with the core remaining stationary. The prior art teachings with cable beads has been limited to taking advantage of this internal rotation in the bead bundle during the shaping operation prior to curing the tire. The goal of the prior art has been to obtain a minimum amount of movement of the body ply fabric in the bead area of the tire.

The present invention utilizes the cable bead concept in a way not envisioned by the prior art. The internal rotation within the cable bead in the tire of this invention is not accomplished to a significant degree prior to the curing operation. The rotation is accomplished during the inflation step after the tire has been cured and mounted. This feature facilitates the rolling action or rotational action that the bead area of the tire of this invention undergoes during its inflation on a tire rim when it is expanded into its toroidal shape.

It is envisioned that this same concept may be utilized with fabric beads; that is, beads having aramid type cords or glass type cords. Due to the flexible nature inherent in these materials, beads with cords of this type will permit the rolling or rotational action of the bead area afte the tire has been cured in a manner similar to that obtained with the cable type beads.

DETAILED DESCRIPTION OF THE INVENTION

FIG. 1 is a cross-sectional view of the tire of this invention in its cured shape after molding and prior to the action of any external forces on the tire;

FIG. 2 is a cross-sectional view of the tire of this invention mounted on a standard rim wherein the tire is in its uninflated, stored position representing its space saving feature;

Figure 3:
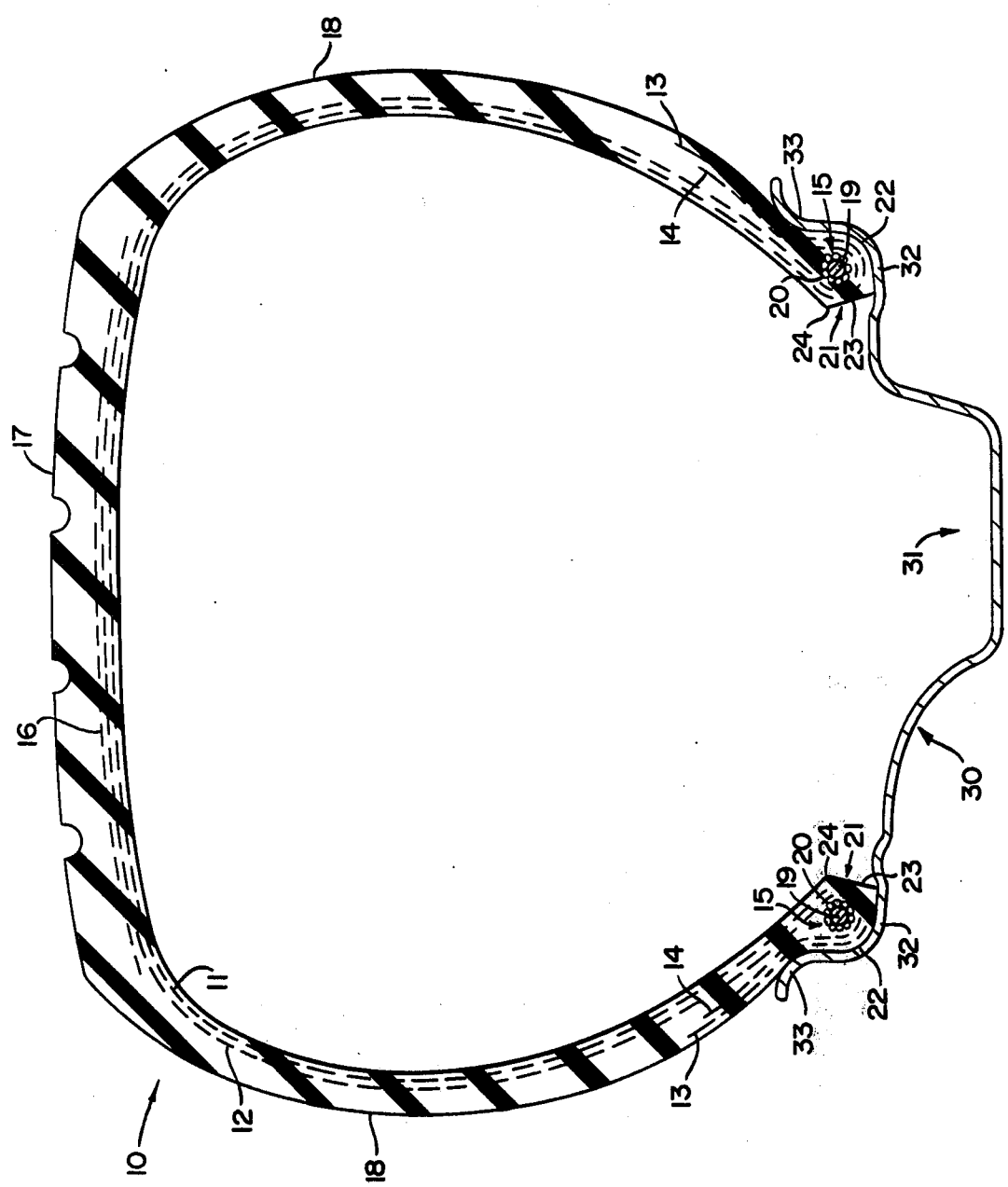
FIG. 3 is a cross-sectional view of the tire of the tire and rim combination of FIG. 2 in its inflated, operable, toroidal shape.

Referring to FIG. 1, the tire of this invention is shown in cross-section in its cured shape after vulcanization and prior to the exertion of any external forces thereon. The tire is shown generally as 10 having two body plies, 11 and 12, with their ends, 13 and 14, respectively, wrapped around wire bead bundles, 15; tread ply 16; tread, 17; and sidewall areas, 18. Each body ply extends from one bead bundle axially to the corresponding bead bundle. Although two body plies are depicted in the drawings, it is understood that the number of body plies may be altered without departing from the scope of this invention.

Each of the body plies is comprised of a series of individual cords that are parallel to one another and are coated with a thin layer of rubber skim stock on both sides. The material in the cords in the body plies may be any one of the standard, reinforcing materials utilized in tire body plies, such as rayon, polyester, aramid, steel, glass or nylon. The cords may be constructed in any of the known cable type constructions. The angle of the cords of the body ply is changed from one ply to the other as is well known in the art with the cords in the first body ply, 11, forming an angle preferably from 55° to 60° to the circumferential centerline of the tire tread on the right-hand side of the circumferential centerline and the cords of the outer body ply, 12, forming an identical angle but directed to the left-hand side of the circumferential centerline of the tire tread. It is understood that the angle of these cords may vary within the range of 50° to 65° to the circumferential centerline of the tire tread without departing from the scope of this invention.

The tire may contain a narrow reinforcing ply in the tread area between the tread and the body plies, but, this ply may be eliminated if is not necessary to strengthen this area of the tire. FIG. 1 shows the tire of this invention having one such tread ply, 16, located in the area of the tire radially inwardly of the tread, 17, and radially outwardly of the body plies. Again, this ply is comprised of a series of parallel reinforcing cords which have been coated on either side with a thin layer of rubber skim stock. The angle of the cords to the circumferential centerline of the tire tread must be such that this ply does not restrict the radial expansion of the tire on inflation but permits the overall diameter of the tire to increase on the order of at least 30% from its cured configuration to its inflated configuration. It is preferred that the angle of the cords in the reinforcing tread ply be on the order of 90° to the circumferential centerline of the tire tread in order to accomplish this expansion, but other lower angles may be utilized without departing from the scope of this invention.

The sidewall areas of the tire, 18, and the tread of the tire, 17, must be flexible enough to permit the drastic dimensional changes that occur in this tire from its cured shape to its folded, uninflated shape to its inflated, toroidal shape. The tread thickness is less than the tread thickness in a standard tire of the same inflated size and the sidewall flexibility is sufficient to permit the folding of the tire as demonstrated in FIG. 2.

In FIG. 1, the bead bundles, 15, of the tire are comprised of a solid metal wire core, 19, with individual strands of metal wire, 20, helically wrapped around it. This is the cable bead type construction which is known in the art. Such a construction permits the rotation of the individual strands, 20, around the core, 19. This invention utilizes this feature after the tire has been cured; that is, the rotation of the bead area occurs, after the cured tire is mounted on a rim with the sidewalls folded, during the inflation of the tire from its uninflated, folded shape to its inflated, toroidal, operable shape. The rotation occurs within the bead bundle as the body fabric is set in place as a result of the curing operation. The drawings show ten strands, 20, but this number may be altered depending on the size of the tire and the bead strength required.

The section of the tire bead area known as the toe is located at 21 and the section known as the heel is located at 22. It is evident from FIG. 1 that the tire is cured in a configuration wherein both the heel and the toe of the bead are located axially outwardly of the corresponding bead bundle. If the bead area were in the standard, fixed, stationary configuration, the two section would be located axially inwardly of the corresponding bead bundle and the heel section axialy outwardly. This is the type of configuration demonstrated by the prior art which has been cited.

The toe section, 21, of the bead area is shown in the Figures to have a flat portion, 23, and a ridge, 24. This configuration facilitates the seal between the bead area and the rim during the rolling movement of the bead area caused by its rotation on inflation of the tire. It is understood this feature may be eliminated without departing from the scope of the invention; such as, by making the bead area in a semi-circular configuration.

FIG. 2 illustrates the tire of this invention after it has been mounted on a rim but prior to inflation. This figure represents the cross-sectional shape of the tire of this invention in its stored or space-saving position. The structural features of the tire in FIG. 2 are identical to the tire described in FIG. 1 and are identified by the same reference numbers.

The rim in FIG. 2 is identified generically as 30 having a drop center area, 31, bounded by the rim base areas, 32, which are in turn bounded by the rim flanges, 33. The drop center area is necessary to facilitate the mounting of the tire on the rim as is well known in the art. The structural features of the rim are well known in the art and merely represent features common to most rims that are utilized with the standard passenger tires.

FIG. 2 demonstrates the manner in which the tire of this invention contacts the rim prior to inflation. In the mounted, uninflated shape, the heel section and the toe section, 22 and 21, respectively, of the tire bead areas, are located axially outwardly of their respective wire bead bundles. The cured configuration of the bead area and the lower sidewall area permits these areas to rest on the rim base, 32, in a position substantially parallel to the axis of rotation of the tire and rim combination. This feature eliminated the severe bend or buckle in the bead area or lower sidewall area of prior tires and permits the tire of this invention to have the capability of having a lower overall diameter in its mounted, folded, space saving, shape and less stresses in its inflated shape.

The seal between the bead area and the rim may be further facilitated by the bead area being constructed to exert a positive pressure axially outwardly on the rim flange when the tire is mounted thereon. This is accomplished by designing the tire of this invention to have its axial distance between its bead areas in its folded shape to be greater than the axial width of the rim it is designed to be mounted upon.

The sidewalls, 18, are shown in FIG. 2 in their space saving position, folded axially inwardly upon themselves to form folds, 25. This position obviously enables the tire to collapse upon itself and attain a smaller overall diameter than its inflated shape.

FIG. 2 depicts the tire of this invention having a folded axial width less than the axial width of the rim. This relationship is possible with the tire and rim combination of this invention but it is understood that the folded tire width may be greater than the rim width without departing from this invention.

FIG. 3 illustrates the tire of this invention in its inflated, operable shape. FIG. 3 contains the same structural features as defined in FIG. 2 with the same reference number utilized therein. FIG. 3 demonstrates that the bead areas of the tire have rolled or rotated about the bead bundle core as a result of the inflation of the tire so that the bead toe section, 21, is located axially inwardly of its corresponding bead bundle and the bead heel section, 22, is located axially outwardly of its corresponding bead bundle. This is accomplished during the inflation of the tire by the bead areas of the tire rolling through an arc on the order of 90° or more. This motion brings the tire bead areas into the standard, fixed relationship with the rim and rim flange.

The absence of the buckle in the lower sidewall area immediately above or radially outwardly of the bead area and the resistance to bending caused thereby permits the tire of this invention to attain this inflated shape without causing undue stresses in this area of the tire. The prior tires with this buckle are required to push out the buckle on inflation. The tire of this invention merely rolls about its bead bundle and doesn't have to push out on any opposing force (such as the cured force in the prior tires which commands the tire to retain its cured configuration). Any stress created by the inflation of the tire of this invention on inflation are in the bead bundle area where they will have little or no effect on the tire's performance.

Employing the technology which is the subject of this invention, a D78–14 tire has been constructed in which the body plies comprised polyester reinforcing cords of 1300/3 denier and a tread ply comprising polyester reinforcing cords of 1000/2 denier. The bead bundle was comprised of a cable bead having a solid wire core of 0.10 inches in diameter and eight helically wrapped steel wires of 0.05 inches in diameter. The tire was built on a standard flat drum utilizing standard building techniques. The tire was cured in a special mold to yield the molded shape depicted by FIG. 1. In this molded shape the overall diameter of the tread at the circumferential centerline of the tire tread was 19.01 inches and at the shoulder of the tread was 19.337 inches. The overall diameter of the bead area radially outwardly of the bead bundle was 14.9 inches.

The tire identified above was mounted on a standard rim having a 14 inch bead diameter and a five inch width from rim flange to rim flange whereby the combination structure depicted in FIG. 2 was obtained with the bead areas and the lower sidewall areas resting on the rim bases. The overall diameter of the tire in this folded position was 19.28 inches as measured at both the tread shoulder and the tread centerline. The overall width of the tire in this folded configuration was less than the width of the rim so that the tire may be thought of as resting completely within the rim.

The tire was then inflated to a standard inflation pressure of 24 psi. During such inflation, the tire and rim attained the configuration shown in FIG. 3. In this configuration the overall diameter of the tire at the circumferential centerline of the tread was 24.67 inches. During this inflation operation, the tire bead area rolled or rotated about the inner core of the bead bundle approximately 105° and the cord angle of the cords in the body plies changed from approximately 56° to approximately 36°.

It was evident from observing the inflation procedure described above that none of the wrinkles in the lower sidewall area occurred as is the case when the prior art, foldable tires are inflated which have fixed, stationary beads with cured buckles in the lower sidewalls immediately above the bead areas. This demonstrates that the lower sidewalls of the tire of this invention are subject to a smaller amount of stresses upon inflation and that any stresses present are in the bead bundle area of the tire which is below the rim flange and not detrimental to tire performance.

The tire of this invention described above was deflated after having been inflated and easily attained the folded configuration shown in FIG. 2 with a small amount of external pressure being applied. When the tire was removed from the rim after these steps it reverted to its curved shape as shown in FIG. 1 without permanent folds in the sidewalls. It could be easily manipulated to the folded position as shown in FIG. 2.

The tire of this invention is particularly suited for use as a spare tire in passenger automobiles but it may also be used on other vehicles, such as, airplanes and trucks.

We claim:

1. In combination a pneumatic tire and rim wherein the rim is comprised of an annular drop center area bounded axially outwardly on either side by annular rim base sections which are in turn bounded axially outwardly by annular rim flanges, said tire is comprised of an annular road-engaging tread, sidewalls connecting the lateral edges of said tread to bead areas which contain annular bead bundles, said tire in a first position when mounted on said rim and uninflated having its bead areas and lower sidewall areas extending axially inwardly from each rim flange in a direction substantially parallel to the axis of rotation of said rim and said sidewalls folded upon themselves to form annular reentrant walls, said tire in a second position when mounted on said rim and inflated having its bead areas and lower sidewall areas substantially perpendicular to the axis of rotation of said rim, said first position utilized when said tire is stored and said second position utilized when said tire is operational, said change in position resulting from a rotation of said bead areas about the center of said bead bundles upon inflation.

2. The combination of claim 1 wherein said bead areas and said lower sidewall areas substantially rest upon said rim base sections when said tire is in said first position.

3. The combination of claim 1 wherein each said bead area has a toe section and a heel section, both said sections being located axially outwardly of their respective bead bundles when said tire is in said first position, said toe sections being located axially inwardly and said heel sections being located axially outwardly of their respective bead bundles when said tire is in said second position.

4. The combination of claim 1 wherein said bead areas contain an annular ridge and an annular flat portion to facilitate the inflation of said tire.

5. The combination of claim 1 wherein said bead areas exert a substantial pressure axially outwardly on said rim flanges when said tire is in said first position.

6. The combination of claim 1 wherein said tire contains a tread ply located axially inwardly of said tread between said tread and the body reinforcing fabric.

7. In the combination of claim 1, said bead bundles are comprised of an aramid type fiber.

8. In the combination of claim 1, said bead bundles are comprised of metal wires having a cable bead type construction.

9. In combination a pneumatic tire and rim wherein the rim is comprised of an annular drop center area bounded axially outwardly on either side by annular rim base sections which are in turn bounded axially outwardly by annular rim flanges, said tire is comprised of an annular road-engaging tread, sidewalls connecting the lateral edges of said tread to bead areas which contain annular bead bundles and a heel and a toe section, said tire in a first position when mounted on said rim and uninflated wherein said heel and toe sections are located axially outwardly of their respective bead bundles and said sidewalls are folded upon themselves to form annular re-entrant walls, said tire in a second position when mounted on said rim and inflated wherein said toe sections are located axially inwardly of their respective bead bundles and said heel sections are located axially outwardly of their respective bead bundles, said first position utilized when said tire is stored and said second position utilized when said tire is operational, said change in position resulting from a rotation of said bead areas about the center of said bead bundles upon inflation.

* * * * *

UNITED STATES PATENT OFFICE
CERTIFICATE OF CORRECTION

Patent No. 4,057,091          Dated November 8, 1977

Inventor(s) James Dennis Gardner & Robert William Glasscock

It is certified that error appears in the above-identified patent and that said Letters Patent are hereby corrected as shown below:

Column 1, line 11, "tire to" should read --tire or--
Column 1, line 16, "space" should read --spare--
Column 1, line 16, "is an" should read --in an--
Column 2, line 55, "inflate" should read --inflated--
Column 4, line 15, "thesame" should read --the same--
Column 4, line 52, "thread" should read --tread--
Column 5, line 51, "selection" should read --section--
Column 6, line 57, "afte" should read --after--
Column 7, line 24, "of the body" should read --in the body--
Column 8, line 18, "two" should read --toe--
Column 8, line 21, "axialy" should read --axially--

Signed and Sealed this

Fourteenth Day of March 1978

[SEAL]

Attest:

RUTH C. MASON          LUTRELLE F. PARKER
Attesting Officer          Acting Commissioner of Patents and Trademarks